Aug. 4, 1964  T. C. LEIGHTON ETAL  3,143,732
IMAGE ROTATION SYSTEM
Filed Sept. 29, 1958  5 Sheets-Sheet 1

INVENTORS
Thomas C. Leighton
Kermit L. Sandefur

By *[signature]*
Attorney

Aug. 4, 1964

T. C. LEIGHTON ETAL 3,143,732

IMAGE ROTATION SYSTEM

Filed Sept. 29, 1958

INVENTORS
Thomas C. Leighton
Kermit L. Sandefur

By Ernest J. Hill
Attorney

Aug. 4, 1964

T. C. LEIGHTON ETAL 3,143,732

IMAGE ROTATION SYSTEM

Filed Sept. 29, 1958

INVENTORS
Thomas C. Leighton
Kermit L. Sandefur

Attorneys

Aug. 4, 1964     T. C. LEIGHTON ETAL     3,143,732
IMAGE ROTATION SYSTEM
Filed Sept. 29, 1958                          5 Sheets-Sheet 5
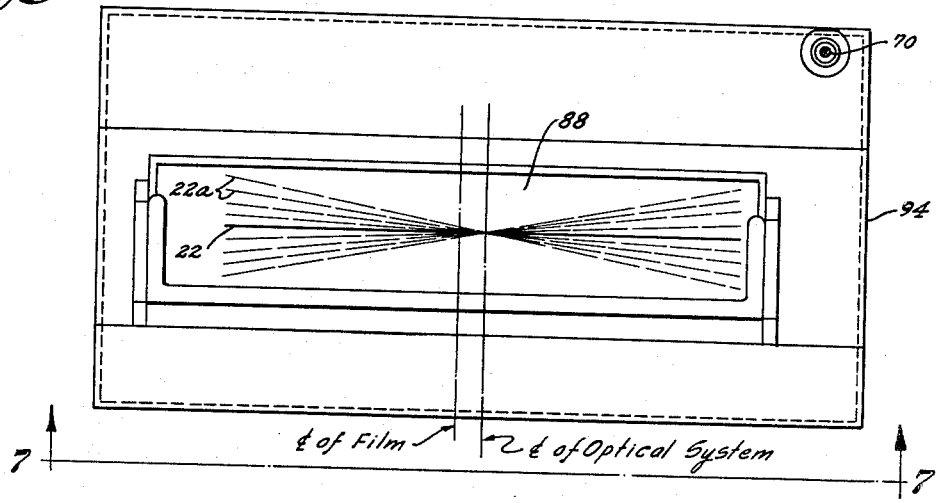
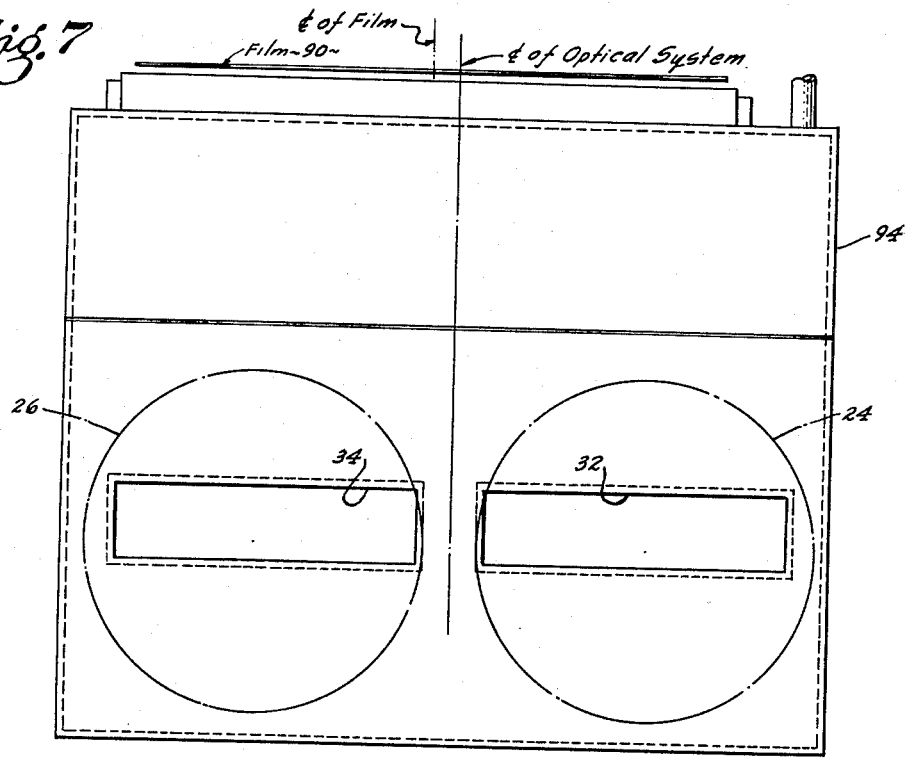
INVENTORS
Thomas C. Leighton
Kermit L. Sandefur
Attorneys

൧

3,143,732
IMAGE ROTATION SYSTEM
Thomas C. Leighton, South Pasadena, and Kermit L. Sandefur, Pasadena, Calif., assignors to Hycon Mfg. Company, Pasadena, Calif., a corporation of Delaware
Filed Sept. 29, 1958, Ser. No. 763,904
6 Claims. (Cl. 343—5)

Our invention relates generally to optical systems and more particularly to an image rotation system for eliminating distortion in a radar-derived picture caused by drift correction of an aircraft mounting an airborne radar strip recorder.

An airborne radar strip recorder generally employs an echo type radar set having left and right side-looking antennas which view narrow strips of terrain below that are oriented at right angles to the flight path. These narrow, lateral strips, as viewed by the radar antennas, are joined directly below the aircraft to form a single narrow strip which is swept along with forward motion of the aircraft, scanning the terrain below in the direction of flight. The terrain over which the aircraft flies is thus scanned by the side-looking radar set on both sides of the flight path in a swath, covering a 15 mile lateral range, for example, on each side of the flight path. The left and right narrow lateral strips are antenna scan lines which are respectively reproduced on the faces of two cathode ray tubes each as an intensity modulated line trace, presenting a radar line image of each narrow strip. The traces on the faces of the two cathode ray tubes can be continuously photographed and recorded by a suitable strip camera in which light sensitive film is moved at a proper speed to produce a radar ground map of terrain flown over by the aircraft. There will, however, be a gap between the two traces of left and right lateral strips due to necessary cathode ray tube spacing and consequent line trace separation.

Drift is the lateral velocity of an aircraft in flight due to prevailing cross winds. If there is no cross wind, the direction of flight and the aircraft heading direction are identical. To eliminate drift, when there exists a prevailing cross wind, the aircraft is normally headed somewhat into the cross wind at a crab angle which is substantially equal and opposite to the drift angle that would have resulted because of the cross wind. Since the side-looking radar antennas are comparatively bulky and usually fixed, the left and right lateral strips viewed by the respective radar antennas are effectively both rotated on a vertical pivot axis through the aircraft in angles which are equal to the crab angle. Thus, the swath area following the flight path of the aircraft will be scanned by skewed scan lines that are not oriented at right angles to the flight path. This results in picture distortion of the viewed terrain, as will be shown later, if the skewness is not corrected.

It is an object of our invention to provide a novel and useful image rotation system for eliminating picture distortion in an airborne radar strip recorder due to drift correction of an aircraft mounting the strip recorder.

Another object of the invention is to provide an image rotation optical system, in an airborne radar strip recorder, for directing and focusing two separate radar line images onto light sensitive moving film with an end of one line image abutting an end of the other.

A further object of our invention is to provide means for simultaneously rotating two abutted radar line images in a plane through a drift correction angle on an axis through the abutting ends perpendicular to the plane. Briefly, and in general terms, the foregoing and other objects are preferably accomplished by providing an optical image rotation system including, for each cathode ray tube, a corrector plate, an adjustable focusing mirror, a lower mirror pair which is rotatably adjustable in a plane for drift (crab angle) correction, an objective lens having an adjustable iris to control image brightness, and an upper mirror pair for folding the light path and directing the light towards a film plane. Light from each line trace of the cathode ray tubes passes through its respective corrector plate and impinges on a focusing mirror. From the focusing mirror, the light is reflected down into the lower mirror pair and back up to the objective lens. The light proceeds through the lens to the upper mirror pair. The two lenses are positioned to abut the two line traces of the cathode ray tubes together as the traces leave the upper mirror pairs and pass through an upper corrector plate to a focus at the film plane. The result is a single line trace imaged on moving film, and the single line trace image can be rotated in the film plane on a perpendicular axis through the center of the single line trace where the two line traces of the cathode ray tubes are abutted together, by adjustment of the lower mirror pair. Rotation of the resultant single line image to the crab angle produces an undistorted picture of radar scanned terrain.

Our invention possesses other objects and features, some of which together with the foregoing, will be set forth in the following detailed description of a preferred embodiment of our invention. The invention will be more fully understood by reading the description with joint reference to the attached drawings, in which:

FIGURE 6 is a drawing of a frontal view of the structure shown in FIGURES 4 and 5; and FIGURE 7 is a drawing of a top plan view taken along the line 7—7 as indicated in FIGURE 6.

Figure 1:
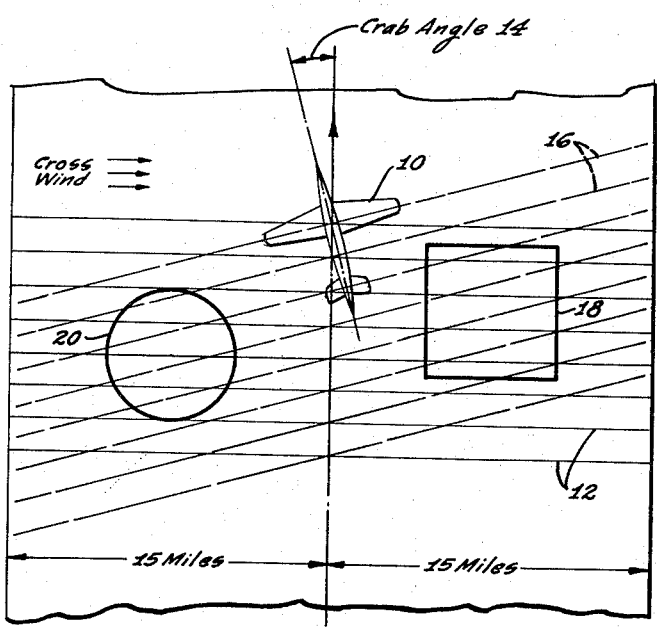
FIGURE 1 is a drawing, somewhat diagrammatic, illustrating an aircraft mounting a side-looking radar set and scanning terrain on both sides of the flight path, the aircraft being corrected for drift due to cross winds.

An aircraft 10 mounting an airborne radar strip recorder is shown in FIGURE 1 flying over terrain which is being scanned on both sides of the flight path by left and right side-looking radar antennas. The side-looking antennas respectively view left and right narrow, lateral strips of terrain which are correspondingly joined directly below the aircraft 10 to form scan lines that are schematically indicated by the light, equally spaced lines 12. The terrain is thus scanned in a swatch which is, for example, 30 miles wide if each radar antenna views to its side a narrow, lateral strip of terrain which is 15 miles long. Since the aircraft 10 must fly at a crab angle 14 to correct for drift due to an indicated prevailing cross wind, the scan lines become skewed to the flight path as indicated by the light, equally spaced broken lines 16. The ground outline of a square area 18 and a circular area 20 are scanned by the skewed scan lines 16.

Figure 2:
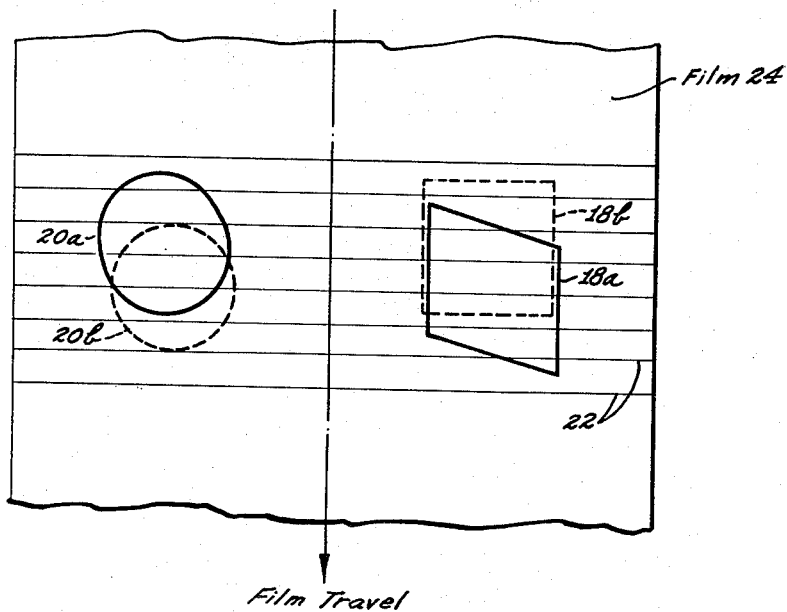
FIGURE 2 is a drawing illustrating the distortion resulting in a picture of the scanned terrain produced on film and caused by drift correction.

The left and right halves of each scan line such as the broken lines 16 are displayed each as an intensity modulated line trace on the face of respective cathode ray tubes which can be positioned adjacently side by side. If the two intensity modulated line traces are optically abutted together in a straight line and used to expose sensitive film moving at a proper speed, a radar ground map can be produced of the scanned terrain. The abutted line traces are indicated in FIGURE 2 as light, equally spaced lines 22 imaged on moving film 24. The lines 22 correspond to the skewed scan lines 16 (FIGURE 1), and the width of the film 24 is proportionate to the swath width of terrain normally scanned by the aircraft 10. The length of an intensity modulated line trace on the face of each cathode ray tube is, however, proportional point for point to the lateral distance of the corresponding scan line half from the center (base) point of a skewed scan line 16. Thus, by measuring the distances from the base point of each skewed scan line 16 to the intersection points of square 18 and circle 20, and measuring proportionate distances respectively on corresponding imaged trace lines 22 from their central abutting points, images 18a and 20a of square 18 and circle 20, respectively, are obtained. The image 18a is distorted into the form of a parallelogram and is also positioned ahead and slightly to the right of its normal position as indicated by the broken line square 18b. The image 20a is also distorted into an ellipse, and it is located behind and slightly to the left of its normal position as indicated by the broken line circle 20b. In order to correct and eliminate this distortion and relative mis-positioning, the imaged line traces 22 can be first rotated on pivot points coinciding with the abutting ends (centers) of the traces 22, in the plane of the film 24, for an angle equal to the crab angle 14 and in the same direction.

Figure 3:
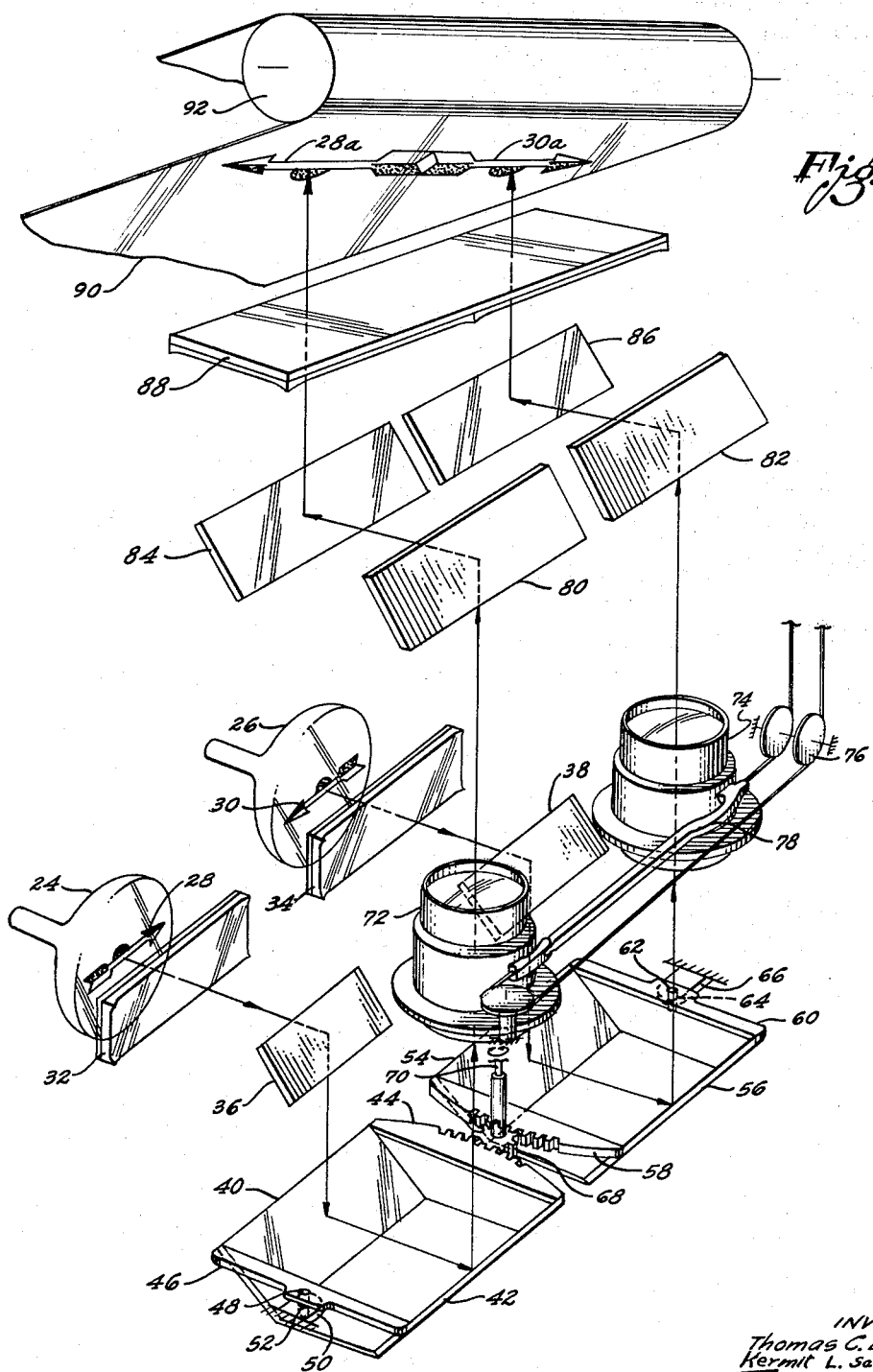
FIGURE 3 is a perspective schematically depicting the structure and operation of a preferred embodiment of the invention.

Rotation of the line traces on the faces of the cathode ray tubes and, of course, their images, can be easily accomplished by suitably rotating the deflection coils of the cathode ray tubes on their respective central (tube) axes, and it is then only necessary for the optical system to abut the ends of the traces together properly. This, however, is not possible with cathode ray tubes which do not utilize electromagnetic deflection means and it is, of course, not very feasible usually to rotate the tubes themselves. Accordingly, the image rotation system schematically illustrated in FIGURE 3 is useful and desirable, particularly where accurate and effective adjustment is required. Cathode ray tubes 24 and 26 are substantially fixed in position and display line images 28 and 30, respectively, of left and right halves of a skewed scan line 16 (FIGURE 1). The line images 28 and 30 are depicted as arrows, the arrow heads corresponding to the outer (farthest out) ends of a scan line 16 and the arrow tails corresponding to a point directly below the aircraft 10 or the center of a scan line 16. The arrow line images 28 and 30 reproduced on the cathode ray tubes 24 and 26, respectively, are shown with arrow heads pointing inwards, toward each other. The arrows (images) could have been easily made to point outwards by having the electron beam in each cathode ray tube deflected from the opposite end in producing its trace. However, the former mode or orientation was selected in order to maintain the optical system in its simplest overall configuration.

Light from the line images 28 and 30 pass through respective corrector plates 32 and 34 and are reflected by focusing mirrors 36 and 38, which are adjustable to some extent in position. The light from mirror 36 is reflected downwards to a mirror pair comprising mirrors 40 and 42 which are mounted in a frame arrangement having an arcuate gear segment 44 affixed to one end and a flange strip 46 affixed to an opposite end. The flange strip 46 has a pivot hole 48 located centrally in it. A fixed tab 50 having an upright pivot pin 52 which engages the hole 48, rotatably supports the mirror pair 40 and 42. The light from mirror 38 is also reflected by another similar mirror pair comprising mirrors 54 and 56 which are also mounted in a frame arrangement having an arcuate gear segment 58 affixed to one end and a flange strip 60 affixed to an opposite end. The flange strip 60 has a central pivot hole 62 which engages an upright pivot pin 64 on a fixed tab 66. The two gear segments 44 and 58 both mesh with a pinion 68, as shown, which is attached to and can be rotated by a flexible cable 70. The flexible cable 70 passes through a suitable guide and the end of flexible cable 70 is attached to a knob (not shown) which indicates against a dial calibrated in degrees of drift correction. Rotation of this knob drives the pinion 68 which, in turn, causes the two mirror pairs to rotate on the pivot pins 52 and 64 equally in opposite directions, in a horizontally inclined plane. The arcuate gear segments 44 and 58 both actually ride on guide ledges which are in the same plane as the fixed tabs 50 and 66 so that the mirror pairs are restricted to rotary movement in a single plane.

Reflected light from mirrors 42 and 56 are respectively passed through lenses 72 and 74, which are necessary to produce sharp images instead of a blur of light. The lenses 72 and 74 are inverting lenses and are separated at a proper distance to produce abutting line images on moving film. If non-inverting (erecting) lenses are used, the line images 28a and 30a would each appear rotated 180 degrees from that shown in FIGURE 3 so that the arrow heads are pointing towards each other at the center of the film. The lenses 72 and 74 each has an adjustable iris to control image brightness. Both irises can be adjusted by the pulley system 76 shown in FIGURE 3 which moves an iris control rod 78 back and forth to simultaneously open or close each iris in both lenses 72 and 74. The light from lenses 72 and 74 impinge on mirrors 80 and 82, respectively, and are reflected on to mirrors 84 and 86 which, in turn, direct the light through corrector plate 88 onto moving film 90, exposing the film. The film 90 is driven by a drive roller 92 and is rapidly processed as it moves around the roller by rapid film processing equipment (not shown). The processed film is moved off the roller 92 and is taken up on a takeup spool (not shown) which is located a little distance to the left, in the illustration of FIGURE 3. An observer normally stands at the left also, at the end of the radar strip recorder and looks down on the processed film as it moves past a viewing window. The images 28a and 30a which are exposed on the film 90 are seen to be inverted images of the original cathode ray tube images 28 and 30, and the arrow tails are abutted together properly. Thus, the observer standing to the left will view a correctly reproduced image of the cathode ray tube line traces which are abutted together to form a single line image. This line image is an accurate reproduction of a scan line 16 (FIGURE 1), and can be adjusted to produce an accurate ground map of the terrain scanned.

As was illustrated in FIGURE 2, an accurate ground map can be obtained by rotating the imaged trace lines 22 on their center points to the crab angle 14 (FIGURE 1) such that the trace lines 22 are skewed to correspond with the skewed scan lines 16. The imaged arrows 28a and 30a correspond, of course, to an imaged trace line 22 in FIGURE 2. In order to rotate the imaged arrows 28a and 30a on an axis through the abutting arrow tails, the pinion 68 can be rotated by the knob attached to the end of flexible cable 70. The effect on the imaged trace lines 22 of rotating the lower mirror pairs by pinion 68 can be more readily understood by reference to FIGURE 4 which is a simplified side view of a preferred construction of the image rotation system, with side panel deleted, and by joint reference to FIGURE 5 which is a view taken along the line 5—5 in FIGURE 4. The image rotation system is contained in a generally rectangular housing 94 which is, in turn, mounted within a radar strip recorder housing having a normally horizontal (shown sloping in FIGURE 4 so that the optical system is shown level) top panel 96 which includes a viewing window 98 for observing the processed film 90. A knob 100, which is affixed to the end of the flexible cable 70, is mounted to the top panel 96 and is used to adjust the skewness of the abutted line images presented to film 90, for drift correction. An imaged line trace 22 which is presented to film 90 is illustrated in FIGURE 6, which is a simplified top plan view of the housing 94 for the image rotation system. An intensity modulated line trace 22 can be seen through the top corrector plate 88, and this line trace 22 can be rotated in a flat plane on its center pivot point by rotation of knob 100 attached to flexible cable 70. The skewed broken lines 22a in FIGURE 6 indicate the effect and range of rotating the flexible cable 70 in one direction or the other.

Figure 4:
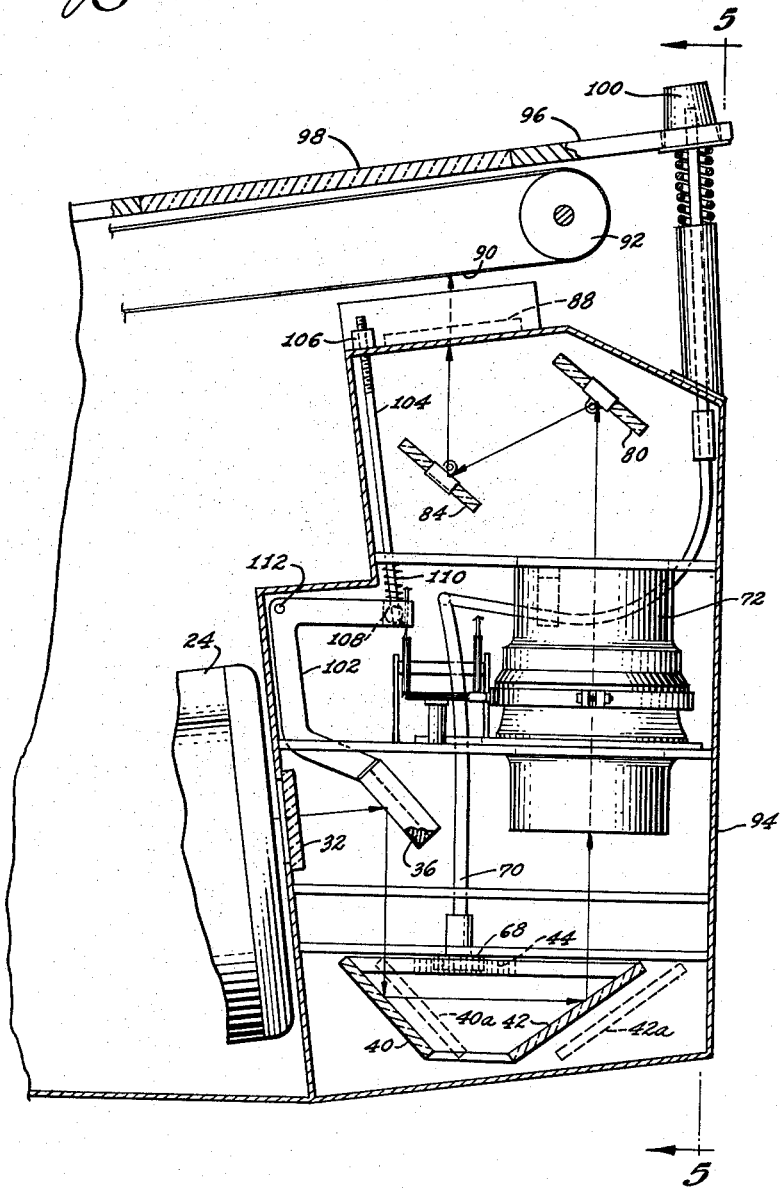
FIGURE 4 is a simplified drawing showing a side view of the actual structure of the preferred embodiment of the invention.
Figure 5:
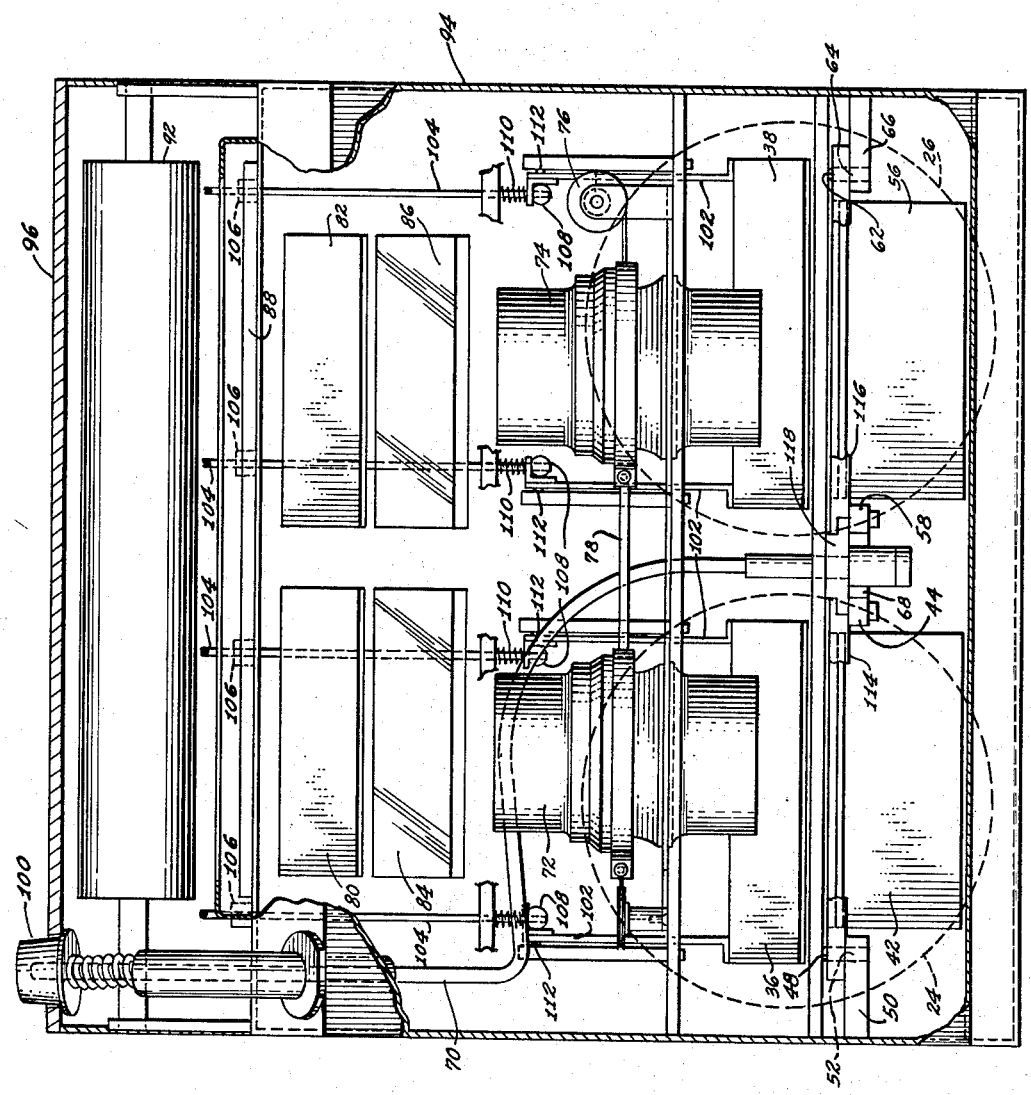
FIGURE 5 is a simplified drawing of a view taken along the line 5—5 as indicated in FIGURE 4.

The arrangement of the various optical elements shown in FIGURES 4 and 5 is substantially the same as was illustrated in FIGURE 3. The cathode ray tubes 24 and 26 are positioned before corrector plates 32 and 34 respectively. The corrector plates 32 and 34 are located in the front of the housing 94 as shown in FIGURE 7, and are symmetrical to the indicated center line of the optical system. The center line of the film 90 does not coincide with the center line of the optical system in this embodiment in order to obtain some free space at one side of the film 90, for marking and identifying indicia. The corrector plates 32 and 34 are structurally identical to corresponding halves of the upper corrector plate 88, which is essentially two corrector plates affixed to a single base plate (see FIGURE 3). Effectively, the entire optical system can be considered bound by corrector plate end elements, each pair of end elements, for example, corrector plate 32 and the corresponding left half of corrector plate 88 being equivalent to a single corrector plate that could be suitably positioned in the system. If a single corrector plate of comparable field flattening power as a pair of the split elements was properly positioned in the optical system, however, the resultant image would be drastically affected undesirably. A good image is retained by use of the pair of split power corrector plate elements which are positioned symmetrically at the extremes of the optical system, near the end image planes. This novel arrangement of end elements additionally corrects all symmetrical aberrations such as lateral color and coma which would be introduced by the ordinary insertion of a single corrector plate in the system. Astigmatism naturally in the optical system is also reduced since negative astigmatism is added by the corrector plates. A unit magnification (or other) optical system can be used.

The focusing mirrors 36 and 38 are mounted dependently from pivoted lever arms 102 which are attached to the mirrors 36 and 38 near the edges, as shown in FIGURES 4 and 5. Long, spring-loaded adjustment screws 104 having threads at the upper ends which engage fixed nuts 106, are secured at the lower ends to the other ends of the lever arms 102 by tapped spheres 108 that thread with the lower ends of the long screws 104. Four springs 110 respectively spring-load each adjustment screw 104 as indicated. The pivot points 112 of the focusing mirrors 36 and 38 are selected at a point (FIGURE 4) which provides focusing adjustment without introducing any appreciable lateral movement of the images. The mirrors 36 and 38 can also be tilted very slightly about a central axis which is in the plane of each mirror and generally parallel to the lever arms 102, since the adjustment screws 104 can be independently adjusted. The adjustment screws 104 of mirrors 36 and 38 are normally adjusted an equal amount for each pair of screws 104 to obtain a sharply focused image in the plane of film 90.

Light is reflected from the focusing mirrors 36 and 38 to the lower mirror pairs. As indicated in FIGURE 4, a central ray from mirror 36 is directed towards mirrors 40 of the mirror pair comprising mirrors 40 and 42. As is well known, the image seen by the lower mirror 40 is apparently located an equal distance beyond the reflecting surface of the mirror 36. The line image 28 would be indicated as a point in the drawing of FIGURE 4 above mirror 36. The lower mirrors 40 and 42 are fixed in an angular relationship such that the mirrors are preferably positioned at right angles to each other. Thus, if the reflecting surfaces of mirrors 40 and 42 were extended in FIGURE 4, the surfaces would intersect at right angles in a line just slightly below the lower panel of housing 94, and this line would, of course, appear as a point in FIGURE 4. Considering the lower mirror pair as a unit, a line drawn from the apparent position above mirror 36 of the line image seen by mirror 40 through the intersecting point of the lower mirror pair to a distance equal to that from the apparent position of the image above mirror 36 to the mirror pair intersection point, will locate the apparent position of the lower mirror pair reflected image. An observer, for example, standing in front of a vertical intersecting mirror pair similar to mirrors 40 and 42 will see his image on a line through the intersection of the mirrors just like an ordinary plane mirror image.

If, now, the mirrors 40 and 42 are both bodily moved laterally to the right to the broken line positions indicated as 40a and 42a in FIGURE 4, this is the same effectively as if the original apparent image above mirror 36 had been moved to the left, and the lower mirror pair remained stationary. However, a line now drawn from the original apparent image position above mirror 36 through the intersection point of the broken line position 40a and 42a of mirrors 40 and 42 to a distance equal to that from the original apparent image position above mirror 36 to the intersection point of the broken line positions 40a and 42a would establish that the apparent position of the lower mirror pair reflected image has moved laterally to the right for a distance which is twice that laterally moved by the lower mirror pair to the broken line positions 40a and 40b. By fixing an end of the lower mirror pair 40 and 42 to pivot pin 52 (FIGURE 3) such that the mirrors 40 and 42 are moved laterally proportionately according to their length or distance from the pivot pin 52, it is apparent that a line image as indicated by arrow 28 and seen by the mirror pair will also be proportionately moved laterally point for point from the pivot point. The result is that a line image is rotated on a point corresponding to the pivot point established by pivot pin 52, with rotation of the mirror pair. A similar action occurs, of course, for the other lower mirror pair including mirrors 54 and 56 since the optical system is generally symmetrical.

There exists an axis of rotation for a particular location of the lower mirror pair, 40 and 42, in correspondence with the remainder of the optical system associated therewith, such that the arrow tail of the line image 28 shown in FIG. 3 will not move when the lower mirror pair, 40 and 42, is rotated about the axis. There also exists an axis of rotation for a particular location of the lower mirror pair 54 and 56, in correspondence with the remainder of the optical system associated therewith, such that the arrow tail of the line image 30 shown in FIG. 3 will not move when the lower mirror pair, 54 and 56, is rotated about said axis. The axes of pivot pins 52 and 64 must be located respectively on these axes of rotation. The precise location of the pivot pins 52 and 64 for a given optical system is related to the dihedral angle between the mirror pair 40 and 52 and the dihedral angle between the mirror pair 54 and 56, as well as to the remaining geometry of the optical system. The axes of pviot pins 52 and 64 are both parallel with the optical axes of lenses 72 and 74. From the preceding description, it follows that the arrow tails are anchored from lateral movement and the line images can be rotated with rotation of the lower mirror pairs. Since the two lower mirror pairs are driven in opposite although symmetrical directions, the arrow line images 28a and 30a (FIGURE 3) are rotated as a single line image about a pivot point located between the abutting arrow tails. If the lenses 72 and 74 were non-inverting lenses, the arrow line images 28a and 30a (FIGURE 3) would each appear rotated 180 degrees and touching at the center of the film. However, the arrow tails of the line images 28a and 30a remain anchored, and the arrow heads at the center would be rotated in oposite directions away from each other in proportion to the angle through which the mirror pairs are rotated. Rotation of knob 100 turns the flexible cable 70 which drives the pinion 68 shown in FIGURE 5. The pinion 68 meshes with gear segments 44 and 58 which are screwed to frame members 114 and 116, respectively, which actually mount the mirror pairs. The flanged end of the frame members 114 and 116 ride on the ledges of a guide piece 118, and the other ends (flange strips 46 and 60) rest on fixed tabs 50 and 66, engaging the pivot pins 52 and 64, and movements of the mirror pairs are restricted to an optically horizontal plane.

It should be noted that the lower mirror pairs are not restricted to mirrors which are separated angularly at 90 degrees, and that larger or smaller angles, for example, in the range of 90 plus or minus 15 degrees, are equally satisfactory for use in the disclosed structure of the preferred embodiment. Modified, but equivalent, structure would be generally dependent upon the condition that in a mirror pair, a light ray entering at any angle is reflected out at an angle twice the included angle of the pair of mirrors. As was previously described, light from the lower mirror pairs is passed through the inverting lenses 72 and 74 in which the optical axes are suitably separated to provide abutting line images in the plane of the film 90, after reflection from the upper mirror pairs and passing through upper corrector plate 88. Additional adjustment of the line images can, of course, be obtained by electrically varying the starting point of the electron beam traces on the faces of the cathode ray tubes 24 and 26. The movements of the mirror pairs are restricted to a plane which maintains the images provided by the lenses 72 and 74 in the film plane continually in complete focus over the full rotational adjustment range of the image rotation system.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

In order to comply with the statute, our invention has been described in language more or less specific as to structural features. It is to be understood, however, that the invention is not limited to the specific features shown, but that the means and construction herein disclosed comprise the preferred form of several modes of putting the invention into effect, and our invention is, therefore, claimed in any of its forms or modifications within the legitimate and valid scope of the appended claims.

We claim:

1. In an airborne radar strip recorder, a drift correcting image rotation system, comprising: means for providing simultaneous left and right radar-derived line images; a left mirror pair positioned to view the left line image and provide a reflected left line image to a film plane, and adjustable to rotate the reflected left line image on a left end pivot point in the film plane; a right mirror pair positioned to view the right line image and provide a reflected right line image to the film plane, and adjustable to rotate the reflected right line image on a right end pivot point in the film plane; and means for simultaneously adjusting said left and right mirror pairs to rotate the reflected left and right line images in the film plane an amount according to drift correction of an aircraft mounting the airborne radar strip recorder.

2. The invention according to claim 1 including, in addition, means for abutting pivot point ends of the reflected left and right line images together in the film plane whereby the left and right pivot points coincide at the abutted ends.

3. An image rotation system, comprising a pair of line objects, a first mirror pair positioned to view a first of said objects and to provide a reflected first line image to an image plane, said first mirror pair being adjustable to rotate said reflected first line image on a first end pivot point in said image plane, a second mirror pair positioned to view a second line object and to provide a reflected second line image to said image plane, said second mirror pair being adjustable to rotate said reflected second line image on a second end pivot point in said image plane, and means for simultaneously adjusting said first and said second mirror pairs to rotate said reflected first and second line images in the image plane.

4. The invention according to claim 3, including in addition, means for abutting pivot point ends of the reflected first and second line images together in the image plane, whereby the first and second pivot points coincide at the abutted ends.

5. An image rotation system for correcting rotated optical images, comprising means for providing simultaneous first and second rotated line images, a first mirror pair positioned to view said first rotated line image and to provide a reflected first line image to an image plane, said first mirror pair being adjustable to rotate said reflected first line image on a first end pivot point in said image plane, a second mirror pair positioned to view said second rotated line image and to provide a reflected second line image to said image plane, said second mirror pair being adjustable to rotate said reflected second line image on a second end pivot point in said image plane, and means for simultaneously adjusting said first and said second mirror pairs to rotate said reflected first and second line images in the image plane in amounts corresponding to the rotation of said first and second rotated optical images.

6. The invention according to claim 5, including, in addition, means for abutting pivot point ends of the reflected first and second line images together in the image plane, whereby the first and second pivot points coincide at the abutted ends.

References Cited in the file of this patent

UNITED STATES PATENTS

| | | |
|---|---|---|
| 813,136 | Balch | Feb. 20, 1906 |
| 1,744,994 | Hofe et al. | Jan. 28, 1930 |
| 2,380,888 | Warmishan | July 31, 1945 |
| 2,406,798 | Burroughs | Sept. 3, 1946 |
| 2,873,381 | Lauroesch | Feb. 10, 1959 |